(12) United States Patent
Gallant et al.

(10) Patent No.: US 8,085,760 B2
(45) Date of Patent: Dec. 27, 2011

(54) METHOD OF AND SYSTEM FOR PROVIDING INTELLIGENT NETWORK CONTROL SERVICES IN IP TELEPHONY

(75) Inventors: John K. Gallant, Plano, TX (US); Steven R. Donovan, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 944 days.

(21) Appl. No.: 11/928,778

(22) Filed: Oct. 30, 2007

(65) Prior Publication Data

US 2008/0049732 A1    Feb. 28, 2008

Related U.S. Application Data

(63) Continuation of application No. 10/654,144, filed on Sep. 3, 2003, now Pat. No. 7,406,073, which is a continuation of application No. 09/405,409, filed on Sep. 24, 1999, now Pat. No. 6,636,596.

(51) Int. Cl.
*H04L 12/66* (2006.01)
*H04L 12/28* (2006.01)
*H04M 7/00* (2006.01)

(52) U.S. Cl. .................... 370/352; 370/351; 379/221.08; 379/221.11; 379/221.13

(58) Field of Classification Search .................. 370/352, 370/401, 351, 522; 379/201.01, 221.08, 379/221.11, 221.13
See application file for complete search history.

(56) References Cited

U.S. PATENT DOCUMENTS

| | | | |
|---|---|---|---|
| 4,850,012 A | 7/1989 | Mehta et al. |
| 5,329,578 A | 7/1994 | Brennan et al. |
| 5,563,938 A | 10/1996 | Soshea et al. |
| 5,928,323 A | 7/1999 | Gosling et al. |
| 5,944,781 A | 8/1999 | Murray |
| 6,002,689 A | 12/1999 | Christie et al. |
| 6,081,518 A | 6/2000 | Bowman-Amuah |
| 6,125,126 A | 9/2000 | Hallenstal |
| 6,141,341 A | 10/2000 | Jones et al. |
| 6,161,008 A | 12/2000 | Lee et al. |
| 6,163,772 A | 12/2000 | Kramer et al. |

(Continued)

FOREIGN PATENT DOCUMENTS

EP    1030503    8/2000

(Continued)

OTHER PUBLICATIONS

Handley et al. RFC 2543, SIP: Session Initiation Protocol, Network Working Group, Mar. 1999, sessions 1-7.

(Continued)

*Primary Examiner* — Thjuan K Addy

(57) ABSTRACT

A method and system for providing intelligent network control services in IP telephony, wherein the system includes a location manager and an IP telephony proxy server. The location manager includes an interface to a legacy telephony service control entity and the IP telephony proxy server includes an IP interface to the location manager. If the IP telephony proxy server requires intelligent network services, then the IP telephony proxy server sends an IP telephony session initiation request to the called party at the location manager. The location manager uses the information to query the legacy telephony service control entity for routing information. When the location manager receives a routing response from the service control entity, the location manager maps the response to an IP telephony session control message back to the IP telephony proxy server.

20 Claims, 3 Drawing Sheets

U.S. PATENT DOCUMENTS

| | | |
|---|---|---|
| 6,169,805 B1 | 1/2001 | Dunn et al. |
| 6,215,858 B1 | 4/2001 | Bartholomew et al. |
| 6,243,443 B1 | 6/2001 | Low et al. |
| 6,249,576 B1 | 6/2001 | Sassin et al. |
| 6,252,952 B1 | 6/2001 | Kung et al. |
| 6,256,389 B1 | 7/2001 | Dalrymple et al. |
| 6,282,281 B1 | 8/2001 | Low |
| 6,292,553 B1 | 9/2001 | Fellingham et al. |
| 6,333,931 B1 | 12/2001 | LaPier et al. |
| 6,374,102 B1 | 4/2002 | Brachman et al. |
| 6,477,578 B1 | 11/2002 | Mhoon |
| 6,584,093 B1 | 6/2003 | Salama et al. |
| 6,636,593 B1 | 10/2003 | MeLampy et al. |
| 6,795,535 B1 | 9/2004 | Weeren et al. |
| 6,823,318 B1 | 11/2004 | Creswell et al. |
| 6,829,232 B1 | 12/2004 | Takeda et al. |
| 6,856,676 B1 | 2/2005 | Pirot et al. |
| 6,970,566 B1 | 11/2005 | Kimura |
| 6,987,579 B1 | 1/2006 | Jones et al. |
| 6,996,573 B2 | 2/2006 | Syvanne |
| 2002/0056001 A1 | 5/2002 | Magee et al. |
| 2006/0067309 A1* | 3/2006 | Zhakov et al. ............ 370/352 |

FOREIGN PATENT DOCUMENTS

| | | |
|---|---|---|
| WO | WO 0056034 | 9/2000 |
| WO | WO 00/79756 | 12/2000 |
| WO | WO 01/10072 | 2/2001 |

OTHER PUBLICATIONS

Wedlund et al., Mobility Support using SIP, ACM 1999 1-58113-129-1/99/08, pp. 76-82.

Chang et al., "Distributed IN Services for Mobile Agent Based Internet Telephony" IEEE, May 7, 2000, pp. 179-188.

Gallant et al., co-pending U.S. Appl. No. 10/654,144, filed Sep. 3, 2003, "Method of and System for Providing Intelligent Network Control Services in IP Telephony".

Gallant et al., co-pending U.S. Appl. No. 11/928,696, filed Oct. 30, 2007, "Method of and System for Providing Intelligent Network Control Services in IP Telephony".

Gallant et al., co-pending U.S. Appl. No. 11/928,746, filed Oct. 30, 2007, "Method of and System for Providing Intelligent Network Control Services in IP Telephony".

Handley, et al., "SIP: Session Initiation Protocol", Internet Engineering Task Force, Internet Draft: ietf-mmusic-sip-12.txt, Jan. 15, 1999, pp. 1-149.

* cited by examiner

METHOD OF AND SYSTEM FOR PROVIDING INTELLIGENT NETWORK CONTROL SERVICES IN IP TELEPHONY

This patent application is a continuation application of patent application Ser. No. 10/654,144, filed Sep. 3, 2003, which is a continuation of patent application Ser. No. 09/405,409, filed Sep. 24, 1999, (now U.S. Pat. No. 6,636,596), both of which are incorporated in their entireties herein.

BACKGROUND

The present invention relates generally to the field of IP telephony, and more particularly to providing intelligent network control services in IP telephony.

Internet telephony is the real-time delivery of voice, and other multimedia data, between two or more parties across a network using Internet protocols (IP). Internet telephony began in the mid-1990s with the introduction of Internet phone software. Internet phone software is designed to run on a personal computer equipped with a sound card, speakers, microphone, and modem. Software compresses the voice signal and translates it into IP packets for transmission over the Internet. This basic PC-to-PC Internet telephony works, however, only if both parties are using Internet phone software.

Internet telephony offers the opportunity to design a global multimedia communications system that may eventually replace the existing circuit switched telephony infrastructure. In a relatively short period of time, Internet telephony has advanced rapidly. Many software developers now offer PC telephony software.

Internet telephony is session based rather than connection based. Generally, a first Internet protocol, such as H.323 or Session Initiation Protocol (SIP) is used to establish the session and negotiate the capabilities for the session, and a second Internet protocol, such Real-time Transport Protocol (RTP), is used to transport the actual media across the IP network.

While IP telephony offers benefits to both users and carriers in terms of cost and variety of media types, there is a substantial installed base of traditional telephones served by the public switched telephone network (PSTN). Moreover, in addition to its widespread nature, the PSTN offers a rich set intelligent network services such as "800" number services, Virtual Private Network (ET) services, call forwarding, and the like. Accordingly, IP telephony is not likely, anytime soon, to replace the PSTN. However, there is a desire to integrate the PSTN with IP networks, including the Internet and private intranets. Thus, there are instances when a call originated by a phone on the PSTN will be required to be carried through an IP based network for eventual delivery to a second phone on the PSTN. There is a further desire to provide all of the intelligent network services that currently exist in the PSTN to IP telephony calls.

SUMMARY

The present invention provides a method of and system for providing intelligent network control services in IP telephony. The system includes a location manager and an IP telephony proxy server. The location manager includes an interface to a legacy telephony service control entity, such as service control point (SCP). The IP telephony proxy server, which may be, for example, an H.323 gatekeeper or a Session Initiation Protocol (SIP) proxy server, includes an IP interface to the location manager.

When the IP telephony proxy server receives a request to initiate an IP telephony session or call to a called party address or number, the IP telephony proxy server determines if it needs intelligent network services in order to route the request to the called party address or number. Examples of sessions requiring intelligent network services are "800" calls and virtual private network (VNET) calls. If the IP telephony proxy server requires intelligent network services, the IP telephony proxy server sends an IP telephony session initiation request to the called party at the location manager. The location manager uses the information received from the IP telephony proxy server to query the legacy telephony service control entity for routing information. When the location manager receives a routing response from the service control entity, the location manager maps the response to an IP telephony session control message back to the IP telephony proxy server.

DETAILED DESCRIPTION

Figure 1:
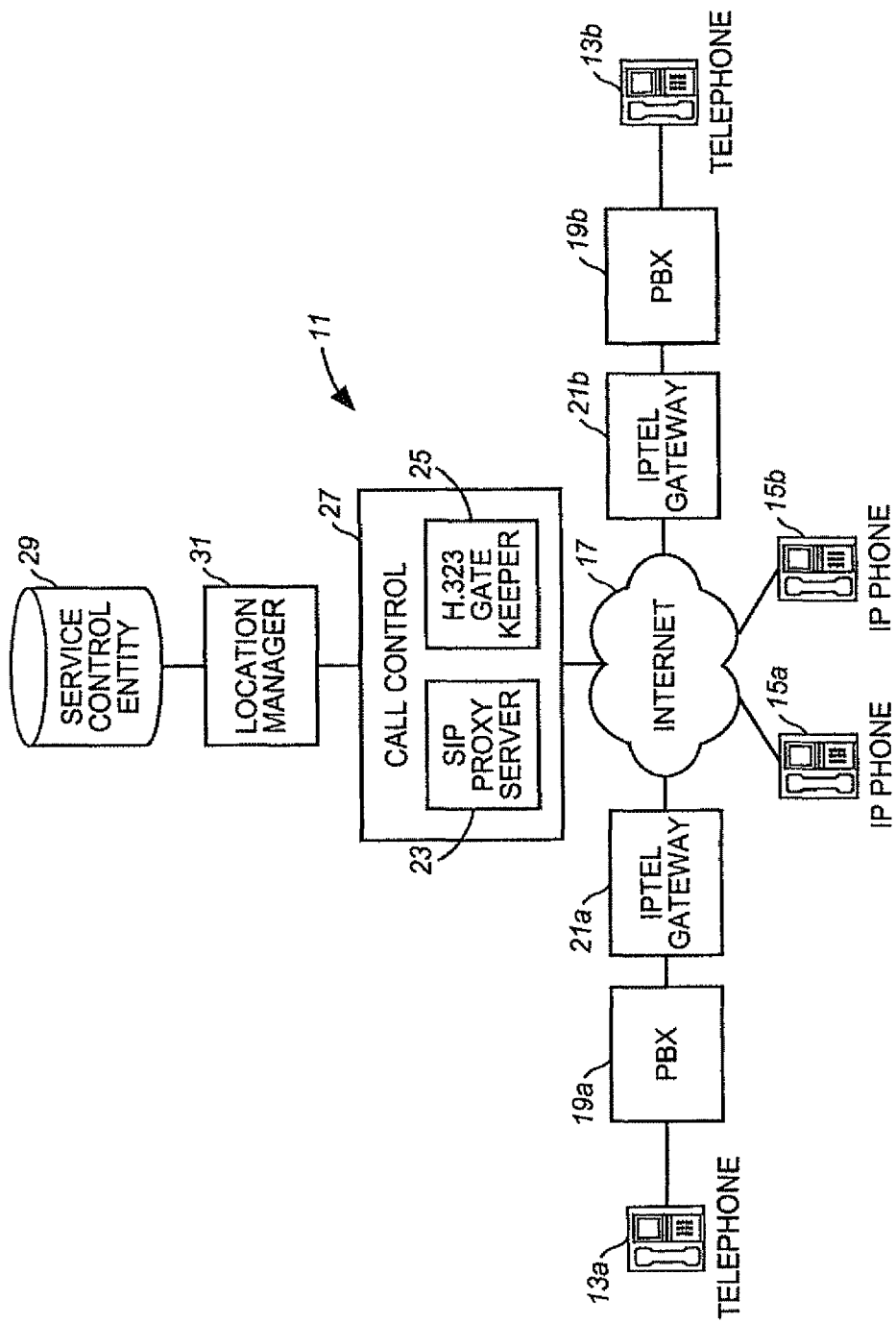
FIG. 1 is a block diagram of a system according to the present invention.

Referring now to the drawings, and first to FIG. 1, a system according to present invention is designated generally by the numeral 11. The system 11 is adapted to provide telephony services between and among subscribers using traditional telephones 13 and Internet telephones 15. The signaling and media for calls according to the present invention are transported at least in part over the Internet, indicated generally at 17.

Traditional telephones 13 are connected to Internet 17 through traditional telephone switching equipment, such as PBXs 19 and IP telephony gateways 21. IP telephony gateways 21 each include a signaling gateway (not shown) and a media gateway (not shown). The signaling gateway provides bidirectional translation between PSTN telephony signaling, such as SS7, messages and IP telephony signaling messages in protocols such as H.323 or Session Initiation Protocol (SIP). Typically, media gateways use one IP signaling protocol or the other, but not both. The media gateway provides bidirectional conversion between time division multiplexed (TDM) signals and IP transport packets in a protocol such as real-time transport protocol (RTP). IP phones 15 may be connected directly to be Internet through a local area network or by modem connection through an Internet service provider.

Generally, call signaling and media are transported across Internet 17 between an ingress IP telephony gateway 21a and an egress IP telephony gateway 21b. Typically, routing information is supplied by a proxy server, such as a SIP proxy server 23 or an H.323 gatekeeper 25. In the SIP protocol, and invite message is sent from the ingress IP telephony gateway 21a to the address of the called party at the SIP proxy server 23. For normal calls that do not require intelligent network services, the SIP proxy server 23 knows the address of the called party at the egress IP telephony gateway 21b. IP call setup signaling messages are transported back and forth between the IP telephony gateways 21 and the SIP proxy server 23 until the call is setup. In the present invention, the SIP proxy server 23 and the H.323 gatekeeper 25 are combined in a call control entity 27.

The proxy servers 23 and 25 cannot, by themselves, handle calls that require intelligent network services. Examples of calls requiring intelligent network services are "800" number calls, Virtual Private Network (VNET) calls, local number portable calls, call forwarded calls, and the like. In traditional PSTN telephony, switches consult service control entities, known as service control points (SCPs), for routing information, such as number translation, in order to route calls properly.

The system 11 makes use of a legacy PSTN system service control entity indicated generally at 29, which may be an SCP. The system 11 includes a location manager 31, which provides alias resolution, gateway selection, and mobility management services to the call control entity 27, as well as accessing the service control entity 29 for such services as VNET and local number portability services on behalf of the call control entity 27.

The location manager 31 functions as a SIP redirect server. A redirect server is a server that accepts a SIP request, maps the address into zero or more new addresses and returns are these addresses to the client. Unlike a SIP proxy server, a redirect server does not initiate its own SIP requests. Unlike a SIP user agent server, a redirect server does not accept calls. Thus, if a server of the call control entity 27 cannot send a session initiation request to the IP telephony gateway 21, then the server sends a session initiation request to the called party at the location manager 31. The location manager 31 either consults its own database or accesses the legacy service control entity 29 to obtain a new address for the called party. The location manager 31 then returns the new address to the appropriate server of the call control entity 27.

In a preferred embodiment of the present invention, the H.323 gatekeeper 25 is modified to function in the SIP protocol. Thus, the H.323 gatekeeper 25 communicates with H.323 IP telephony gateways and Internet appliances in the H.323 protocol, and with SIP IP telephony gateways, Internet appliances, and the location manager 31 in the SIP protocol.

Figure 2:
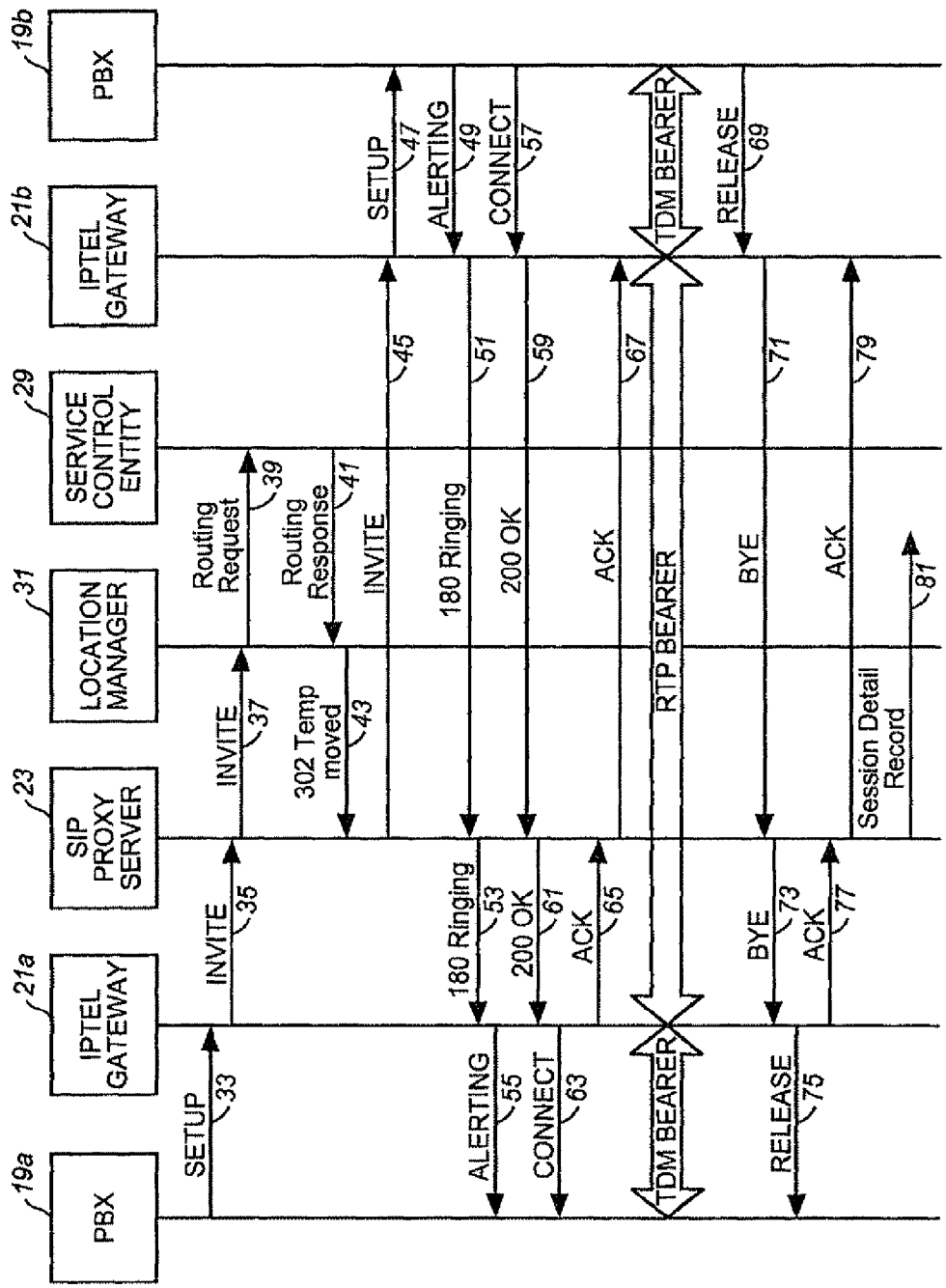
FIG. 2 is a call flow diagram of processing of a virtual private network (VNET) call according to one embodiment of the present invention.

Referring now to FIG. 2, the PBX 19a sends a setup message 33 to the IP telephony gateway 21a. The IP telephony gateway 21a maps of the setup message 33 into a SIP invite request 35 addressed to the SIP proxy server 23. The SIP proxy server 23 is unable by itself to process setup for a VNET call. Accordingly, the SIP proxy server 23 sends a SIP invite request 37 to the dialed number at the location manager 31.

Upon receipt of the invite request 37, the location manager 31 queries the service control entity 29 with a routing request 39. The service control entity 29 performs a data lookup and responds to the location manager 31 with a routing response 41. The location manager 31 maps response 41 into a SIP temporarily moved response 43 directed back to SIP proxy server 23. As is well-known those skilled in the art, SIP responses are identified by a number, which for the case of the temporarily moved response is 302. The response 43 provides the SIP proxy server 23 with an IP address for the called party at the egress IP telephony gateway 21b. Accordingly, the SIP proxy server 23 sends an invite request 45 to the called party at the egress IP telephony gateway 21b.

Upon receipt of the invite 45, the egress IP telephony gateway 21b sends a setup message 47 to the PBX 19b. When the PBX 19b rings the line of the called party, the PBX 19b sends an alerting message 49 back to the egress IP telephony gateway 21b. The egress IP telephony gateway 21b then sends a SIP 180 ringing message 51 back to the SIP proxy server 23, which in turn sends a SIP 180 ringing response 53 to the ingress IP telephony gateway 21a. The ingress IP telephony gateway 21a then sends an alerting message 55 to the PBX 19a, which provides a ringing tone to the caller party. When the called party answers, PBX 19b sends a connect message 57 to the egress IP telephony gateway 21b. The egress IP telephony gateway 21b in turn sends a SIP 200 OK response 59 to the SIP proxy server 23. The proxy server 23 sends a 200 OK response 61 to the ingress IP telephony gateway 21a. Upon receipt of the response 61, the ingress IP telephony gateway 21a sends a connect message 63 to the PBX 19a and a SIP ACK request 65 to the SIP proxy server 23. The SIP proxy server 23 sends an ACK request 67 to the egress IP telephony gateway 21b and the VNET session is established.

At the conclusion of the VNET session, the called party hangs up and the PBX 19b sends a release message 69 to the egress IP telephony gateway 21b. The egress IP telephony gateway 21b maps release 69 into a SIP BYE request 71 addressed to the calling party at SIP proxy server 23. The SIP proxy server 23 then sends a BYE request 73 to the calling party at the ingress IP telephony gateway 21a. The ingress if telephony gateway 21a sends a release message 75 to the PBX 19a to terminate the call. The ingress IP telephony gateway 21a also sends an ACK request 77 to the SIP proxy server 23. The SIP proxy server 23 sends an ACK request 79 back to the egress IP gateway 21b. The SIP proxy server 23 also sends a session detail record 81 to an appropriate billing authority.

Figure 3:
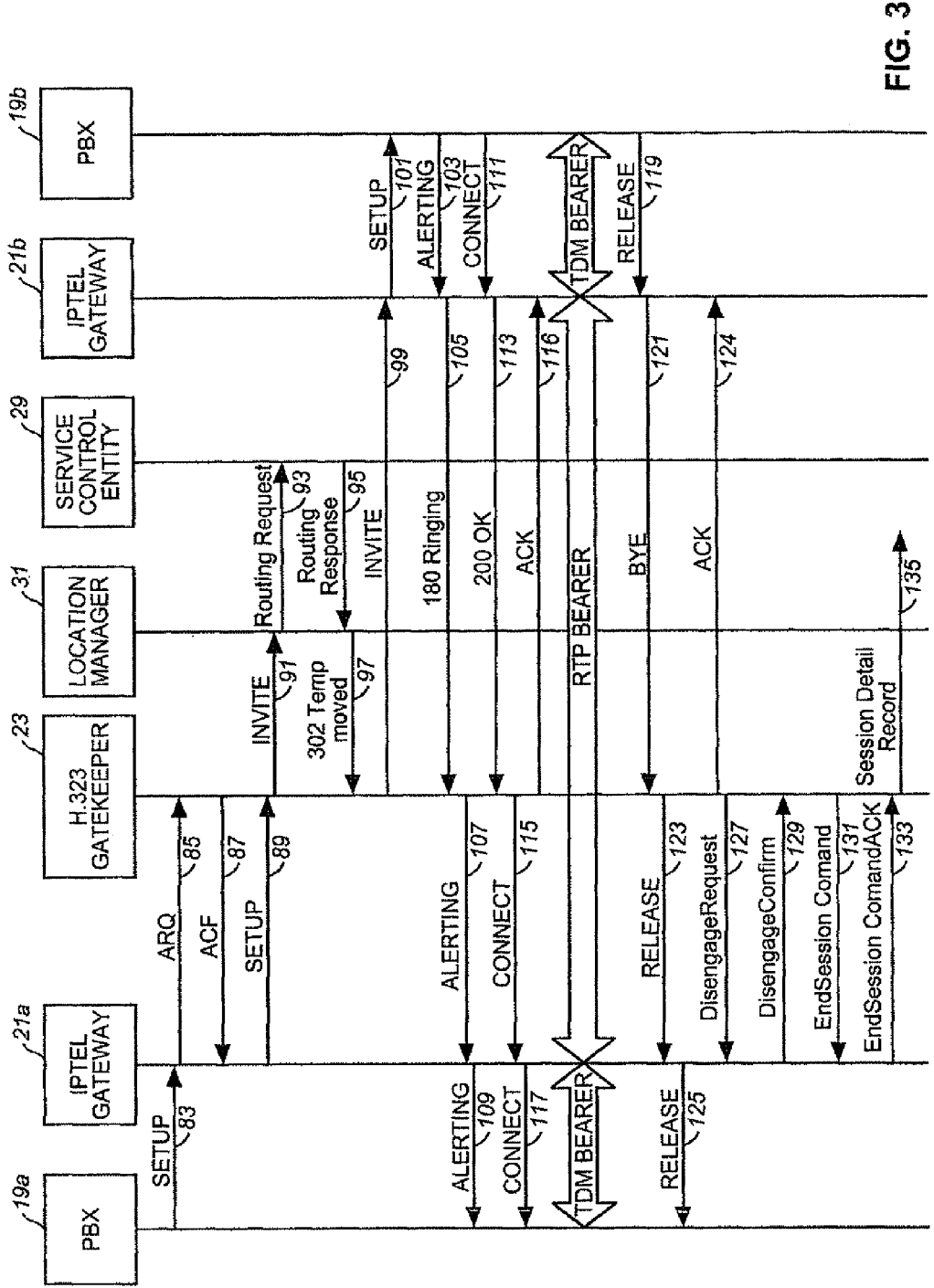
FIG. 3 is a call flow diagram of processing of a virtual private network (VNET) call according to an alternative embodiment of the present invention.

Referring now to FIG. 3, in which the signaling gateway of the ingress IP telephony gateway 21a uses the H.323 protocol. The PBX 19a sends a setup message 83 to the ingress IP telephony gateway 21a. The ingress IP telephony gateway 21a maps the setup message 83 into an H.323 ARQ message 85 addressed to the H.323 gatekeeper 25. The H.323 gatekeeper 25 responds to message 85 with an H.323 ACF message 87. Upon receipt of message 87, the ingress if telephony gateway 21a sends an H.323 setup message 89 to gatekeeper 25. The H.323 gatekeeper 25 is unable by itself to process setup for a VNET call. Accordingly, the H.323 gatekeeper 25 sends a SIP invite request 91 to the dialed number at the location manager 31.

Upon receipt of invite request 91, the location manager 31 queries the service control entity 29 with routing request 93. The service control entity 29 performs a data lookup and responds to the location manager 31 with a routing response 95. The location manager 31 determines that the call should be routed to the called party at the egress IP telephony gateway 21b and sends a SIP 305 temporarily moved response 97 back to the H.323 gatekeeper 25. The H.323 gatekeeper 25 sends a SIP invite request 99 to the called party at the egress IP telephony gateway 21b. Upon receipt of the SIP invite request 99, the egress IP telephony gateway 21b sends a setup message 101 to the PBX 19b. When the PBX 19b rings the line of the called party, the PBX 19b sends an alerting message 103 back to the egress IP telephony gateway 21b. The egress IP telephony gateway 21b then sends a SIP 180 ringing message 105 back to the H.323 gatekeeper 25, which in turn sends a H.323 alerting message 107 to the ingress IP telephony gateway 21a. The ingress IP telephony gateway 21 a then sends an alerting message 109 to PBX 19a, which provides a ringing tone to the calling party. When the called party answers, the PBX 19b sends a connect message 11 to the egress IP telephony gateway 21b. The egress IP telephony gateway 21b in turn sends a SIP 200 OK response 113 to the H.323 gatekeeper 25. The H.323 gatekeeper 25 sends an H.323 connect message 115 to the ingress IP telephony gateway 21a and a SIP ACK request 116 back to the egress IP telephony gateway 21b. Upon receipt of the message 115, the ingress IP telephony gateway 21*a* sends a connect message 117 to the PBX 19*a* and the VNET session is established.

At the conclusion of the VNET session, the called party hangs up and the PBX 19*b* sends a release message 119 to gateway 21*b*. Gateway 21*b* maps release 119 into a SIP BYE request 121 addressed to the calling party at the H.323 gatekeeper 25. The H.323 gatekeeper 25 then sends an H.323 release message 123 to the calling party at the ingress IP telephony gateway 21*a* and a SIP ACK request 124 back to the egress IP telephony gateway 21*b*. The ingress IP telephony gateway 21*a* sends a release message 125 to the PBX 19*a* to terminate the call. According to the H.323 protocol, at the conclusion of the session, the H.323 gatekeeper 25 sends a disengage request 127 to the ingress IP telephony gateway 21*a*, which responds with a disengage confirm 129. Then the H.323 gatekeeper 25 sends an end session command 131 to the ingress IP telephony gateway 21*a*, which responds with an end session command ACK 133. The H.323 gatekeeper 25 then sends a session detail record 135 to the appropriate billing authority.

From the foregoing, it may be seen that the present invention provides a method and system for providing intelligent network services in an IP telephony system. The location manager of the present invention functions as a SIP redirect server to provide signaling routing information to proxy servers. Those skilled in the art will recognize alternative embodiments given the benefit of the foregoing disclosure. Accordingly, the foregoing is intended for purposes of illustration and not of limitation.

What is claimed is:

1. A system comprising:
   a location manager to:
   receive a first Session Initiation Protocol (SIP) invite request from a SIP proxy device,
   acquire a first address for a first called party in response to receiving the first SIP invite request,
   send the first address to the SIP proxy device,
   receive a second SIP invite request from an H.323 device,
   acquire a second address for a second called party in response to receiving the second SIP invite request, and
   send the second address to the H.323 device.

2. The system of claim 1, where the first SIP invite request is associated with an "800" call, a virtual private network (VNET) call, a local number portability request, or a call forwarding request.

3. The system of claim 1, where the second SIP invite request is associated with an "800" call, a virtual private network (VNET) call, a local number portability request, or a call forwarding request.

4. The system of claim 1, where the location manager functions as a SIP redirect server.

5. The system of claim 1, where, when acquiring a first address for a first called party, the location manager is configured to:
   acquire the first address from a local database.

6. The system of claim 1, where, when acquiring a first address for a first called party, the location manager is configured to:
   acquire the first address from a legacy Public Switched Telephone Network system service control entity.

7. The system of claim 1, where the first address includes an address of the first called party at a first egress Internet Protocol (IP) gateway, and
   where the second address includes an address of the second called party at a second egress IP gateway.

8. A method comprising:
   receiving a first Session Initiation Protocol (SIP) invite request from a SIP proxy device;
   obtaining a first address for a first called party in response to receiving the first SIP invite request;
   sending the first address to the SIP proxy device in a first SIP response message;
   receiving a second SIP invite request from an H.323 device;
   obtaining a second address for a second called party in response to receiving the second SIP invite request; and
   sending the second address to the H.323 device in a second SIP response message.

9. The method of claim 8, where at least one of the first SIP invite request or the second SIP invite request relates to an "800" call.

10. The method of claim 8, where at least one of the first SIP invite request or the second SIP invite request relates to a virtual private network (VNET) call.

11. The method of claim 8, where at least one of the first SIP invite request or the second SIP invite request relates to a local number portability request.

12. The method of claim 8, where at least one of the first SIP invite request or the second SIP invite request relates to a call forwarding request.

13. The method of claim 8, where at least one of the obtaining a first address or the obtaining a second address includes:
   sending a routing request to a legacy Public Switched Telephone Network system service control entity.

14. The method of claim 8, where at least one of the obtaining a first address or the obtaining a second address includes:
   accessing a local database.

15. The method of claim 8, where at least one of the first SIP response message or the second SIP response message includes a SIP 302 "temporarily moved" response message.

16. A method comprising:
   obtaining, in response to receiving a first Session Initiation Protocol (SIP) invite request from a SIP proxy device, a first address for a first called party at a first egress Internet Protocol (IP) gateway;
   sending the first address to the SIP proxy device in a first SIP response message;
   obtaining, in response to receiving a second SIP invite request from an H.323 device, a second address for a second called party at a second egress IP gateway; and
   sending the second address to the H.323 device in a second SIP response message.

17. The method of claim 16, where at least one of the first SIP invite request or the second SIP invite request relates to an "800" call or a virtual private network (VNET) call.

18. The method of claim 16, where at least one of the first SIP invite request or the second SIP invite request relates to a local number portability request or a call forwarding request.

19. The method of claim 16, where at least one of the obtaining a first address or the obtaining a second address includes:
   sending a routing request to a legacy Public Switched Telephone Network system service control entity.

20. The method of claim 16, where at least one of the obtaining a first address or the obtaining a second address includes:
   accessing a local database.

* * * * *